United States Patent
Patwa et al.

(10) Patent No.: US 9,269,096 B2
(45) Date of Patent: Feb. 23, 2016

(54) ADVERTISEMENT RENDERING FOR MULTIPLE SYNCED DEVICES

(75) Inventors: Pritesh Patwa, Redmond, WA (US); Martin M Markov, Bellevue, WA (US); Wook Jin Chung, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 485 days.

(21) Appl. No.: 13/113,434

(22) Filed: May 23, 2011

(65) Prior Publication Data

US 2012/0303442 A1     Nov. 29, 2012

(51) Int. Cl.
G06Q 30/00     (2012.01)
G06Q 30/02     (2012.01)
G06F 17/30     (2006.01)

(52) U.S. Cl.
CPC ...... *G06Q 30/0241* (2013.01); *G06F 17/30905* (2013.01); *G06Q 30/0267* (2013.01)

(58) Field of Classification Search
USPC ....................................... 705/14.4
See application file for complete search history.

(56) References Cited

U.S. PATENT DOCUMENTS

| | | | |
|---|---|---|---|
| 5,999,940 A * | 12/1999 | Ranger | |
| 6,912,398 B1 * | 6/2005 | Domnitz | 455/461 |
| 7,069,238 B2 * | 6/2006 | I'Anson et al. | 705/26.64 |
| 7,574,486 B1 * | 8/2009 | Cheng et al. | 709/219 |
| 2003/0028451 A1 * | 2/2003 | Ananian | 705/27 |
| 2007/0022442 A1 * | 1/2007 | Gil et al. | 725/62 |
| 2007/0078714 A1 | 4/2007 | Ott, IV | |
| 2007/0294292 A1 | 12/2007 | Hydrie | |
| 2008/0306913 A1 * | 12/2008 | Newman et al. | 707/3 |
| 2009/0037949 A1 | 2/2009 | Birch | |
| 2009/0063301 A1 | 3/2009 | Ward | |
| 2010/0042470 A1 * | 2/2010 | Chang et al. | 705/10 |
| 2010/0082430 A1 * | 4/2010 | Ramer et al. | 705/14.49 |
| 2010/0094703 A1 * | 4/2010 | Bramley et al. | 705/14.45 |
| 2010/0293050 A1 | 11/2010 | Maher | |
| 2010/0324992 A1 | 12/2010 | Birch | |
| 2010/0332319 A1 | 12/2010 | Etchegoyen | |

OTHER PUBLICATIONS

Delivering Interactive Multimedia Services in Dynamic Pervasive Computing Environments—Published Date: 2008 http://www.lab.novay.nl/~hesselma/publications/AmbiSys08_1.60-clean-web.pdf; 8 pages.

UIML Based Design of Multimodal Interactive Applications with Strict Synchronization Requirements—Published Date: Feb. 2009; http://ieeexplore.ieee.org/stamp/stamp.jsp?tp=&arnumber=4782511; 6 pages.

* cited by examiner

*Primary Examiner* — John G Weiss
*Assistant Examiner* — Scott C Anderson
(74) *Attorney, Agent, or Firm* — Dave Ream; Aaron Hoff; Micky Minhas

(57) ABSTRACT

Methods and systems for synchronizing communication of different versions of an advertisement to multiple, disparate devices associated with a user are provided. The advertisement is received on a first device associated with the user. Incident to receiving the advertisement, the first device establishes a communication path with a second device associated with the user. Utilizing the communication path, capabilities of the second device are determined. A version of the advertisement is rendered for the second device, where the version rendered is dependent upon the determined capabilities of the second device. And, utilizing the communication path, the rendered version of the advertisement is communicated to the second device.

25 Claims, 6 Drawing Sheets

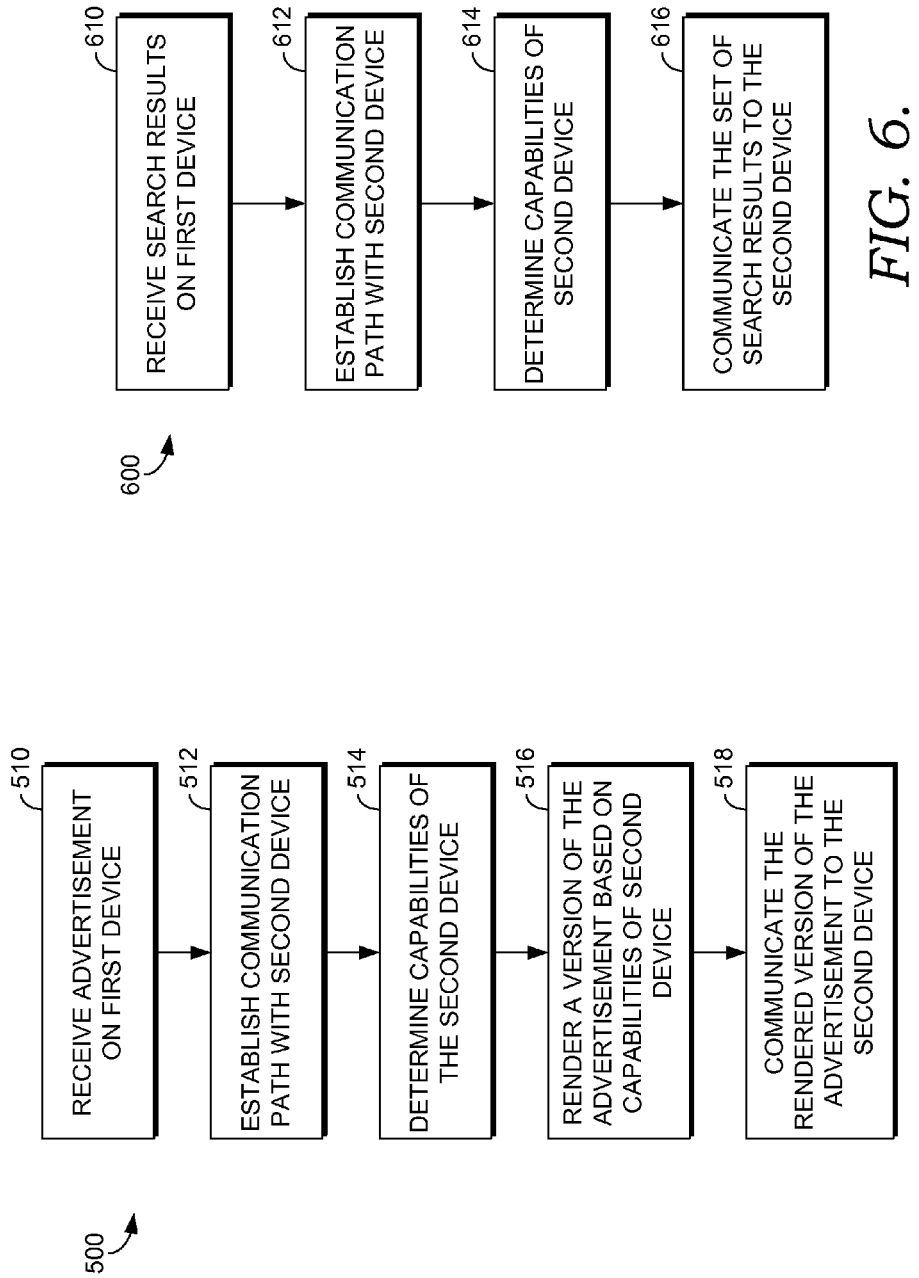

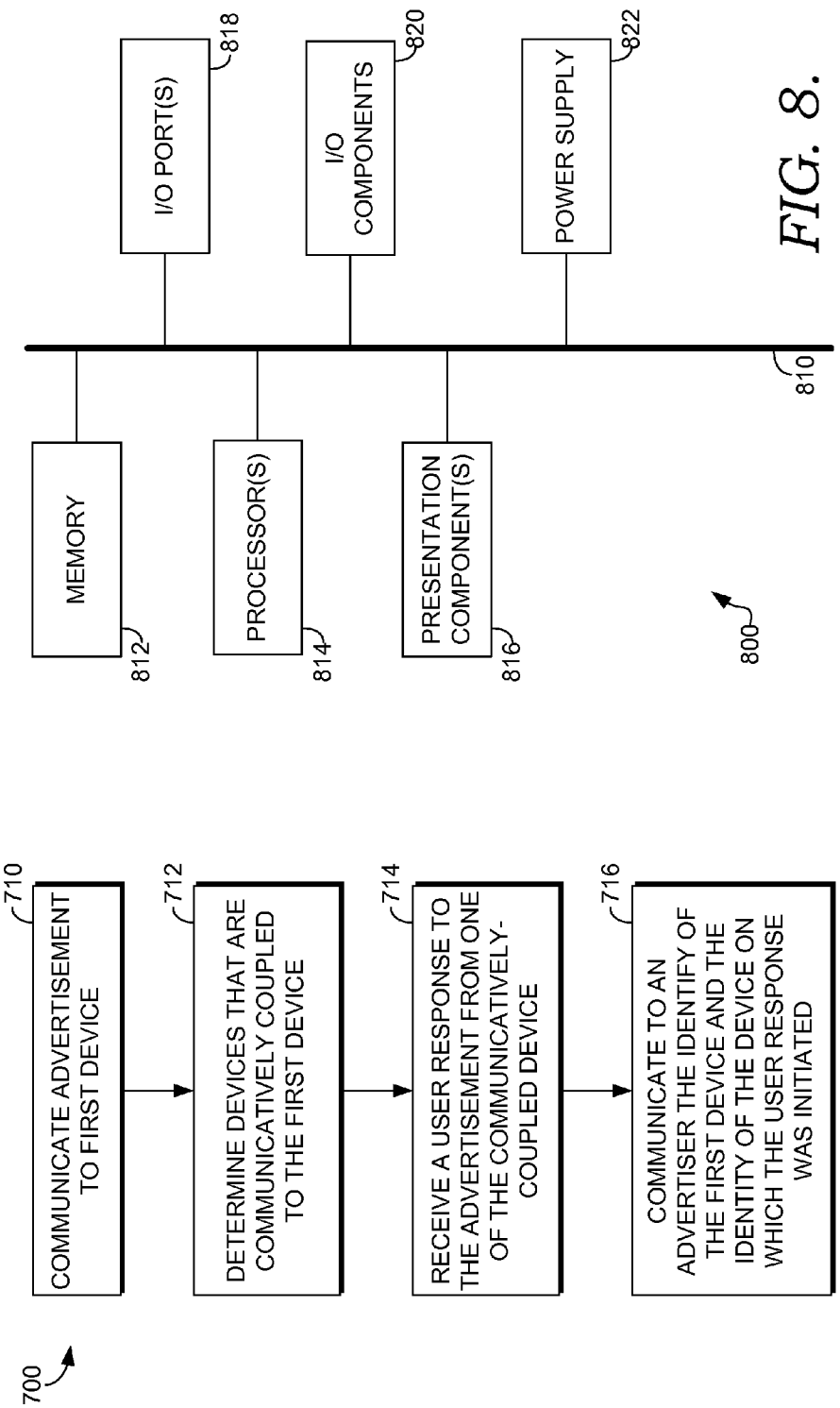

ADVERTISEMENT RENDERING FOR MULTIPLE SYNCED DEVICES

BACKGROUND

Currently advertisers who wish to market a product have to launch multiple advertisement campaigns across different devices in order to take advantage of the capabilities of the different devices. For example, an advertiser may wish to market a new car. The advertiser generates one advertisement campaign that is geared towards television and which emphasizes visual elements as these elements are best shown on a television. The advertiser then generates another advertisement campaign that is designed to take advantage of the capabilities of a cellular phone. For example, a location and a phone number of a dealership that sells the car are highlighted in the cellular phone campaign as these elements find their best expression on a cellular phone. The result is that the advertiser ends up funding multiple campaigns across the different devices—an expensive and inefficient proposition for the advertiser.

An additional problem with generating multiple campaigns across different devices is that the advertiser does not know which advertising campaign actually spurred the consumer to take action. For example, a consumer may view a company's advertisement on a television. The consumer later conducts a Web search on a computer for the company; at this point, the consumer decides to purchase a product from the company using the computer. From the advertiser's perspective, it appears that the Web search drove the consumer's response, when, in actuality, it was the television advertisement that led the consumer to buy the product.

Another problem for advertisers occurs when an advertising campaign runs late at night. With respect to the advertisement campaign concerning the car, the advertisement might require the consumer to call a dealership's phone number to take advantage of special deal terms. But if the advertisement is run late at night, it is likely too late to call the number. In addition, the consumer will have likely forgotten the phone number by the time morning arrives. The result is a loss of potential customers.

Yet another problem for advertisers is the lack of portability of some of the advertisements. For example, a personal computer may display a coupon for $10 off a pizza. However, the personal computer is not portable. Instead, the consumer has to print off the coupon and bring the coupon in to the pizza establishment. This can be problematic if the consumer does not have ready access to a printer.

An additional problem from a consumer or user's perspective is the inability to transfer a set of search results from one device to another device. For instance, a user may run a search on a cellular phone and be very pleased with the search results. However, the user cannot easily transfer the search results to another device. Instead, the user is forced to rerun the search on the new device and could potentially end up with a different set of results that are less helpful.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, leveraging the capabilities of different devices associated with a user in order to present a unified advertisement and search engine experience across the devices. In brief and at a high level, the capabilities of a set of communicatively-coupled devices associated with a user are determined, and appropriate versions of a single advertisement are rendered and communicated to the devices. Each device displays a version of the advertisement that takes full advantage of the capabilities of that particular device. In another aspect, the devices display a uniform set of search results, but a graphical representation of the set of search results on each of the devices is dependent upon the determined capabilities of the device. In addition, the present invention enables an advertiser to track a performance of a unified advertising campaign across a set of user-associated devices.

BRIEF DESCRIPTION OF THE DRAWINGS

The present invention is described in detail below with reference to the attached drawing figures, wherein:

FIG. 5 depicts an illustrative flow diagram that depicts a method of synchronizing communication of different versions of an advertisement to multiple, disparate devices associated with a user in accordance with an embodiment of the present invention;

FIG. 6 depicts an illustrative flow diagram that depicts a method of synchronizing communication of a set of search results to multiple, disparate devices associated with a user in accordance with an embodiment of the present invention;

FIG. 7 depicts an illustrative flow diagram that depicts a method for enabling an advertiser to track a performance of an advertisement across a set of communicatively-coupled devices associated with a user in accordance with an embodiment of the present invention; and FIG. 8 is a block diagram of an exemplary computing environment suitable for use in implementing embodiments of the present invention.

DETAILED DESCRIPTION

Figure 1:
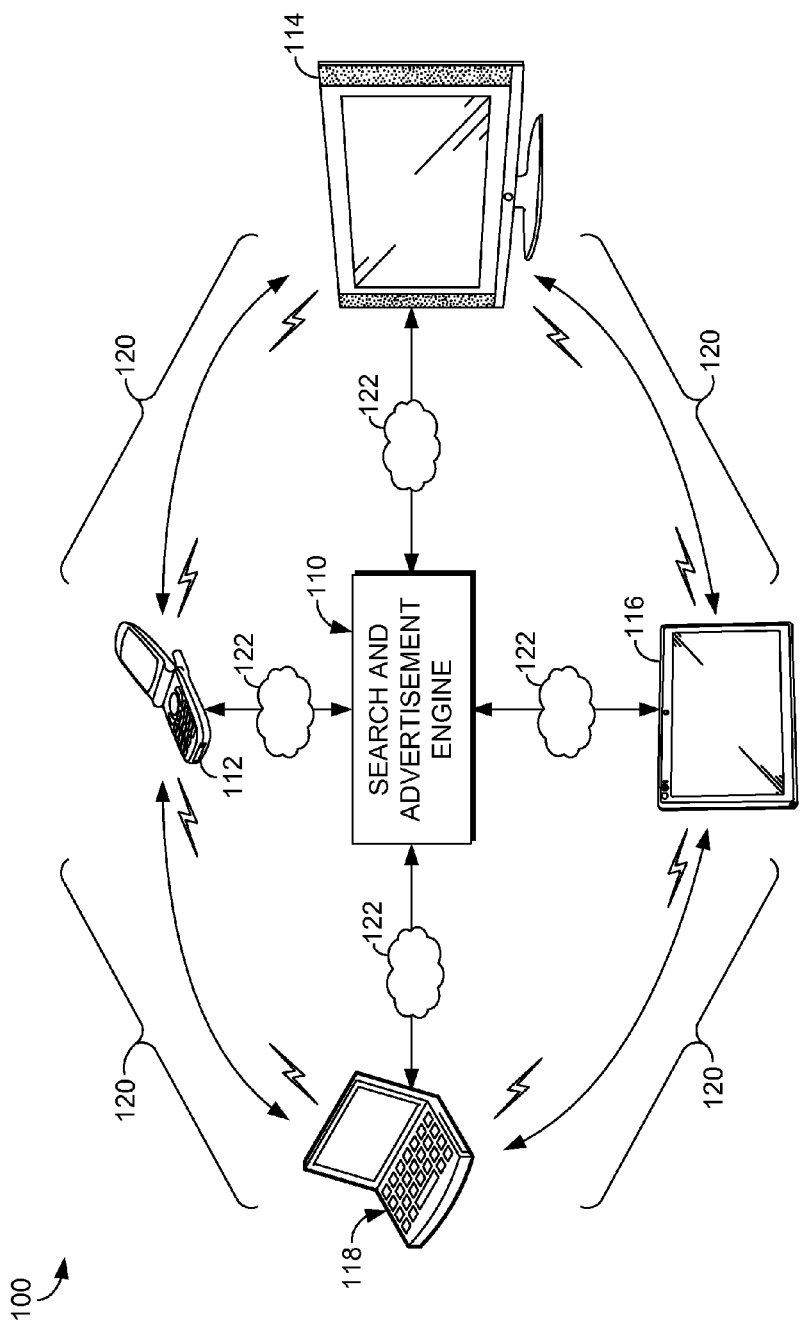
FIG. 1 is a block diagram of an exemplary system for synchronizing the communication of multiple versions of an advertisement or a set of search results to a set of devices suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems, methods, and computer-readable media for, among other things, leveraging the capabilities of different devices associated with a user in order to present a unified advertisement and search engine experience across the devices. In brief and at a high level, the capabilities of a set of communicatively-coupled devices associated with a user are determined, and appropriate versions of a single advertisement are rendered and communicated to the devices. Each device displays a version of the advertisement that takes full advantage of the determined capabilities of that particular device. In another aspect, the devices display a uniform set of search results, but a ranking order of the search results on each of the devices is dependent upon the determined capabilities of the device. In addition, the present invention enables an advertiser to track a performance of a unified advertising campaign across a set of user-associated devices.

Accordingly, in one embodiment, the present invention is directed toward computer-readable media having computer-executable instructions embodied thereon, that, when executed, facilitate a method of synchronizing communication of different versions of an advertisement to multiple, disparate devices associated with a user, where the version communicated is dependent upon the capabilities of the particular device. The advertisement is received on a first device associated with the user; and, incident to receiving the advertisement, the first device establishes a communication path with a second device associated with the user. Utilizing the communication path, the capabilities of the second device are determined. In turn, a version of the advertisement is rendered for the second device; the version rendered is dependent upon the determined capabilities of the second device. The rendered version of the advertisement is communicated to the second device utilizing the communication path.

In another embodiment, the present invention is directed toward computer-readable media having computer-executable instructions embodied thereon, that, when executed, facilitate a method of synchronizing communication of a set of search results to multiple, disparate devices associated with a user. A set of search results is received on a first device associated with the user. Upon receiving the set of search results, the first device establishes a communication path with a second device associated with the user. Utilizing the communication path, the capabilities of the second device are determined. The set of search results is communicated to the second device using the communication path. A graphical representation of the set of search results on the second device is dependent upon the determined capabilities of the second device.

In yet another embodiment, the present invention is directed to computer-readable media having computer-executable instructions embodied thereon, that, when executed, facilitate a method for enabling an advertiser to track a performance of an advertisement across a set of communicatively-coupled devices associated with a user. The advertisement is communicated to a first device associated with the user, and a determination is made as to which devices are communicatively coupled to the first device. A user response to the advertisement is received, where the user response is initiated on a device in the set of communicatively-coupled devices. The identity of the first device and the identity of the device on which the user response was initiated are communicated to the advertiser.

Turning now to FIG. 1, a block diagram is illustrated that shows an exemplary system 100 suitable for use in synchronizing the communication of multiple versions of an advertisement or a set of search results to a set of devices in accordance with an embodiment of the present invention. The system 100 shown in FIG. 1 is merely an example of one suitable system and is not intended to suggest any limitation as to the scope of use or functionality of embodiments of the present invention. Neither should the system 100 be interpreted as having any dependency or requirement related to any single module/component or combination of modules/components illustrated therein.

The system 100 includes a search and advertisement engine 110, a cellular phone 112, a television 114, a tablet personal computer (tablet PC) 116, and a personal computer (PC) 118. Each of the components 112, 114, 116, and 118 may be in communication with the search and advertisement engine 110 via a network 122. The network 122 may include, without limitation, one or more local area networks (LANs) and/or wide area networks (WANs). Such networking environments are commonplace in offices, enterprise-wide computer networks, intranets and the Internet. Accordingly, the network 122 is not further described herein.

In turn, the cellular phone 112, the television 114, the tablet PC 116, and the PC 118 may be in communication with one another via a communication path 120. The communication path 120 may utilize a number of communication technologies. For example, the communication path 120 may utilize short-range wireless radio-frequency communication such as, for example, Bluetooth®. In order for the communication path 120 to work effectively when utilizing short-range wireless radio-frequency communication, components 112, 114, 116, and 118 should be within a proximity range of approximately 5 meters up to 35 meters of each other.

The communication path 120 may also be established using near-field communication technology which has a proximity range of up to approximately 20 centimeters. As well, the communication path 120 may be established using a local area network (LAN) which has a possible indoor proximity range of up to approximately 350 feet, and an outdoor proximity range of up to approximately 1000 feet. Other possible ways of establishing the communication path 120 include using a cellular phone network. When utilizing a cellular phone network, the components 112, 114, 116 and 118 do not have to be within a specified proximity range in order to effectively communicate with each other.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Components of the search and advertisement engine 110, the cellular phone 112, the television 114, the tablet PC 116, and the PC 118 may include, without limitation, a processing unit, internal system memory, and a suitable system bus for coupling various system components, including one or more data stores for storing information (e.g., files and metadata associated therewith). Each of the search and advertisement engine 110, the cellular phone 112, the television 114, the tablet PC 116, and the PC 118 typically includes, or has access to, a variety of computer-readable media. By way of example, and not limitation, computer-readable media may include computer-storage media and communication media. In general, communication media enables each computing device to exchange data via a network, e.g., the network 122, or a communication path, e.g., the communication path 120. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The system 100 is merely exemplary. For example, while the search and advertisement engine 110 is illustrated as a single unit, it will be appreciated that the search and advertisement engine 110 is scalable. For example, the search and advertisement engine 110 may in actuality include a plurality of computing devices in communication with one another. Moreover, a data store (not shown), or portions thereof, may be included within, for instance, the search and advertisement engine 110, the cellular phone 112, the television 114, the tablet PC 116, and the PC 118 as a computer-storage medium. The single unit depictions are meant for clarity, not to limit the scope of embodiments in any form.

With continued reference to FIG. 1, the search and advertisement engine 110 may comprise any Web-based search and advertisement engine. For example, the search and advertisement engine 110 may communicate a list of search results in response to a user query initiated on the components 112, 114, 116, or 118. Or the search and advertisement engine 110 may communicate user-requested Web pages to components 112, 114, 116, and 118. In addition, the search and advertisement engine 110 may communicate relevant advertisements to components 112, 114, 116, and 118 when a user searches by using keywords or when the user visits a Webpage.

Continuing on with respect to FIG. 1, each of the components 112, 114, 116, and 118 will be described in general terms. The cellular phone 112 may comprise any type of smartphone. The cellular phone 112 can be thought of as having certain capabilities. For example, the cellular phone 112 is portable and can make or receive voice calls, emails, text messages, and the like. It can browse the Web and run various software applications. In addition, the cellular phone 112 may be equipped with a global positioning system (GPS) that can be used for location tracking, directions, and outdoor location services. The cellular phone 112 may also be equipped with a camera that can capture images that can later be used, for example, to conduct image searches. The cellular phone 112 may be equipped with a microphone for capturing audio inputs or voice commands, as well as an accelerometer for detecting physical movements of the cellular phone 112. In addition, although not large in size, the cellular phone 112 is equipped with a display space. Any and all such variations, and any combination thereof, are contemplated to be within the scope of embodiments of the present invention.

The television 114 may comprise any type of smart television that is capable of wirelessly integrating streaming video, digital video recordings, Internet content, and the like. With respect to capabilities of the television 114, the television 114 has a large viewing surface that is ideal for the presentation of video images and pictures. In addition, the television 114 may have a sound system capable of producing a superior audio experience for a viewer. In addition, the television 114 may be capable of rendering three-dimensional images. Any and all such variations, and any combination thereof, are contemplated to be within the scope of embodiments of the present invention.

The tablet PC 116 may comprise any type of mobile computer. Generally, the tablet PC 116 has capabilities such as, for example, portability, a flat touch screen display, a Web browser, an accelerometer, ambient light and proximity sensors, microphones, and cameras. In addition, the tablet PC 116 may have the ability to render three-dimensional images. Any and all such variations, and any combination thereof, are contemplated to be within the scope of embodiments of the present invention.

The PC 118 may comprise any type of personal computer known in the art. Besides such well-known capabilities as Web browsing and electronic mailing, the PC 118 is uniquely suited for word processing. Other capabilities include image capture, audio input capture, a sound system for audio outputs, a large display space suitable for displaying video images and pictures, and printer capabilities.

Figure 2:
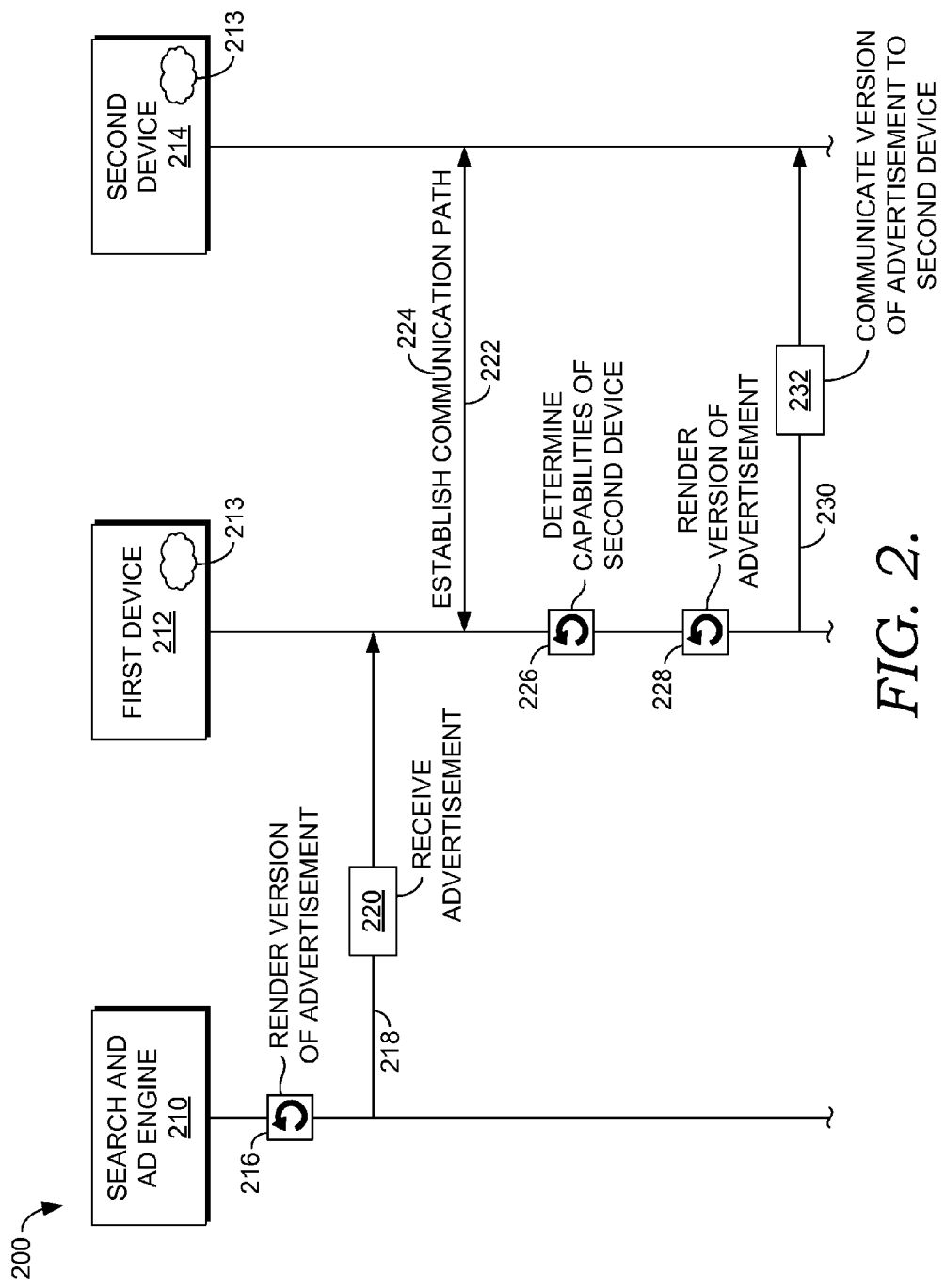
FIG. 2 depicts an illustrative process-flow diagram that depicts a method of synchronizing communication of different versions of an advertisement to multiple, disparate, devices associated with a user in accordance with an embodiment of the present invention.

Turning now to FIG. 2, a process-flow diagram is depicted illustrating a method of synchronizing communication of different versions of an advertisement to multiple, disparate, devices associated with a user. The process-flow diagram is referenced generally by the numeral 200. FIG. 2 includes a search and advertisement engine 210, a first device 212, and a second device 214.

The search and advertisement engine 210 may be any Web-based search and advertisement engine such as, for example, the search and advertisement engine 110 of FIG. 1. The search and advertisement engine 210 is capable of rendering and communicating advertisements to a plurality of different devices. In one aspect, the search and advertisement engine 210 determines capabilities of a device and renders a version of an advertisement that takes advantage of the determined capabilities. By way of illustrative example, an advertiser wishes to run an advertisement campaign that highlights the features of a new food product. A user at home conducts an Internet search for the food product on a television, such as, for example, the television 114 of FIG. 1. The search and advertisement engine 210 determines the capabilities of the television and renders and communicates a version of the advertisement that takes advantage of the determined capabilities. For example, the advertisement may highlight visual features associated with the food product and be accompanied by a soundtrack.

The first device 212 and the second device 214 may be any device associated with a user. The first device 212 and the second device 214 are capable of communicating with the search and advertisement engine 210, each other, and with other devices. The first device 212 and the second device 214 may include, among other things, a cellular phone, a television, a tablet PC, and/or a PC such as, for example, the cellular phone 112, the television 114, the tablet PC 116, and the PC 118 of FIG. 1. The first device 212 and the second device 214 may be registered to the user, be on the user's account, owned by the user, leased by the user, or, in some way, identified with the user.

In one aspect, both the first device 212 and the second device 214 may have an application 213 that enables the devices to discover other user-associated devices and determine their capabilities. The application 213 may also enable the devices to establish a communication path, such as, for example, the communication path 120 of FIG. 1, in order to synchronize the devices. In another aspect, the first device 212 and the second device 214 may innately support synchronization without the use of the application 213. Additionally, the application 213 may enable the devices to render and communicate appropriate versions of an advertisement based on the determined capabilities.

In one aspect of the invention, the first device 212 can receive user inputs generated on the second device 214 and vice versa. By way of illustrative example, a user may be viewing an advertisement on the user's tablet PC. The advertisement requires the user to click on the advertisement to initiate a phone call in order to take advantage of the advertisement's terms. The user is able to initiate the click on the tablet PC, and this input is received on a cellular phone associated with the user. The click received on the cellular phone activates the phone call that allows the user to take advantage of the advertisement's terms.

Continuing on with respect to FIG. 2, at step 216, a version of an advertisement is rendered for the first device 212. The search and advertisement engine 210 is capable of determining when the user is engaged with the first device 212, determining the capabilities of the first device 212, rendering a version of the advertisement based on the determined capabilities, and communicating the advertisement to the first device 212. At step 218, the advertisement 220 is received by the first device 212. In one aspect, the user is engaged with the first device 212 at the time the advertisement 220 is received by the first device 212.

At step 222, a communication path 224 is established between the first device 212 and the second device 214 in order to synchronize the devices. As outlined above, the communication path 224 may comprise a communication path utilizing short-range wireless radio-frequency communication, near-field communication, a local area network, a wide area network, or a cellular phone network. Depending on the type of communication technology utilized by the communication path 224, the first device 212 and the second device 214 may need to be within a proximity range of each other as discussed above. Thus, in some aspects, the first device 212 and the second device 214 may be within a relatively close proximity of each other when communicating, while in other aspects, the first device 212 and the second device 214 need not be close to each other in order to communicate.

Although the communication path 224 may be utilized to synchronize the first device 212 and the second device 214, other ways of synchronizing the devices are contemplated to be within the scope of the invention. By way of illustrative example, a user may register an account for an Internet service and be required to provide a cellular phone number for the account. The search and advertisement engine 210 may have access to the cellular phone number. Thus, the search and advertisement engine 210 may render and communicate a version of an advertisement to a PC and, utilizing the cellular phone number, render and communicate another version of the advertisement to the cellular phone. As can be seen in this example, the first device 212 has not necessarily established the communication path 224 with the second device 214. As well, instead of the first device 212 rendering and communicating a version of the advertisement 220 to the second device 214, the search and advertisement engine 210 renders and communicates the version to the second device 214. Any and all such variations, and any combination thereof, are contemplated to be within the scope of embodiments of the present invention.

At step 226, the first device 212 determines the capabilities of the second device 214. This may include, for example, determining the proximity of the second device 214, determining display size, audiovisual capability, phone call capability, printer capability, Web-browsing capability, portability, word processing capability, image capture capability, electronic mailing capability, three-dimensional rendering capability, audio capture capability, and the like.

In one aspect, if the first device 212 determines that the second device 214 is not within a close proximity of the first device 212, the second device 214 may be used more for a history experience than for a near real-time display of a version of the advertisement 220. For example, suppose the first device 212 is a television, and the second device 214 is a cellular phone and, further, that the cellular phone is determined to not be within a close proximity of the television. Instead of displaying a version of the advertisement being shown on the television, the cellular phone may be used at some later point in time to review a history of advertisements shown on the television within the recent past.

Determining the capabilities of the second device 214 may also include determining an activity state of the second device 214. The second device 214 is considered to be in an active state if it has been recently utilized by the user. In one aspect, the second device 214 is considered to be in an active state if it has been utilized in the past two weeks by the user.

At step 228, the first device 212 renders a version of the advertisement 220 for the second device 214. The version rendered is dependent in part upon the determined capabilities of the second device 214. In one aspect, the first device 212 analyzes a set of data elements associated with the advertisement 220. Although there are many data elements associated with the advertisement 220, some representative examples include image data elements, audio data elements, data elements associated with a phone number, a coupon, or a location, data elements associated with a format of the advertisement 220, and/or data elements associated with emails, surveys, forms, or comments. Any and all such variations, and any combination thereof, are contemplated to be within the scope of embodiments of the present invention.

The set of data elements is utilized in conjunction with the determined capabilities of the second device 214 to render a version of the advertisement 220 that takes full advantage of the capabilities of the second device 214. By way of illustrative example, suppose the first device 212 is a cellular phone and the second device 214 is a PC. The cellular phone receives an advertisement concerning a coupon for a popular clothing line at a local boutique. The advertisement received on the cellular phone includes a phone number for the boutique along with location information (note that this information is particularly suited for a cellular phone). In order for a consumer to take advantage of the coupon, the consumer is required send an email to the boutique outlining any recent experiences they have had at the boutique. Thus, when rendering a version of the advertisement for the PC, the cellular phone will have determined that the PC has good word processing capabilities and that the advertisement requires an email comment. Thus, the advertisement rendered on the PC will focus on the email comment box instead of the phone number and location of the boutique. Continuing on with this same example, once the consumer has submitted an email to the boutique, the coupon will be available for use on the cellular phone.

At step 230, a version 232 of the advertisement 220 is communicated from the first device 212 to the second device 214. In one aspect, the process outlined in FIG. 2 occurs in near real-time in order to provide the user with a seamless advertisement experience across multiple devices. In yet another aspect of the invention, once the advertisement 220 expires, any versions 232 of the advertisement 220 are purged from the devices.

The process outlined in FIG. 2 is applicable to any number of devices. For example, the first device 212 may establish the communication path 224 with a third device associated with the user and determine capabilities of the third device utilizing the communication path 224. As well, the first device 212 may render and communicate a version of the advertisement 220 to the third device. In addition, the second device 214 may establish the communication path 224 with a third device, determine capabilities of the third device, and render and communicate a version of the advertisement 220 to the third device, where the version rendered is dependent upon the determined capabilities of the third device. Any and all such variations, and any combination thereof, are contemplated to be within the scope of embodiments of the present invention.

Figure 3:
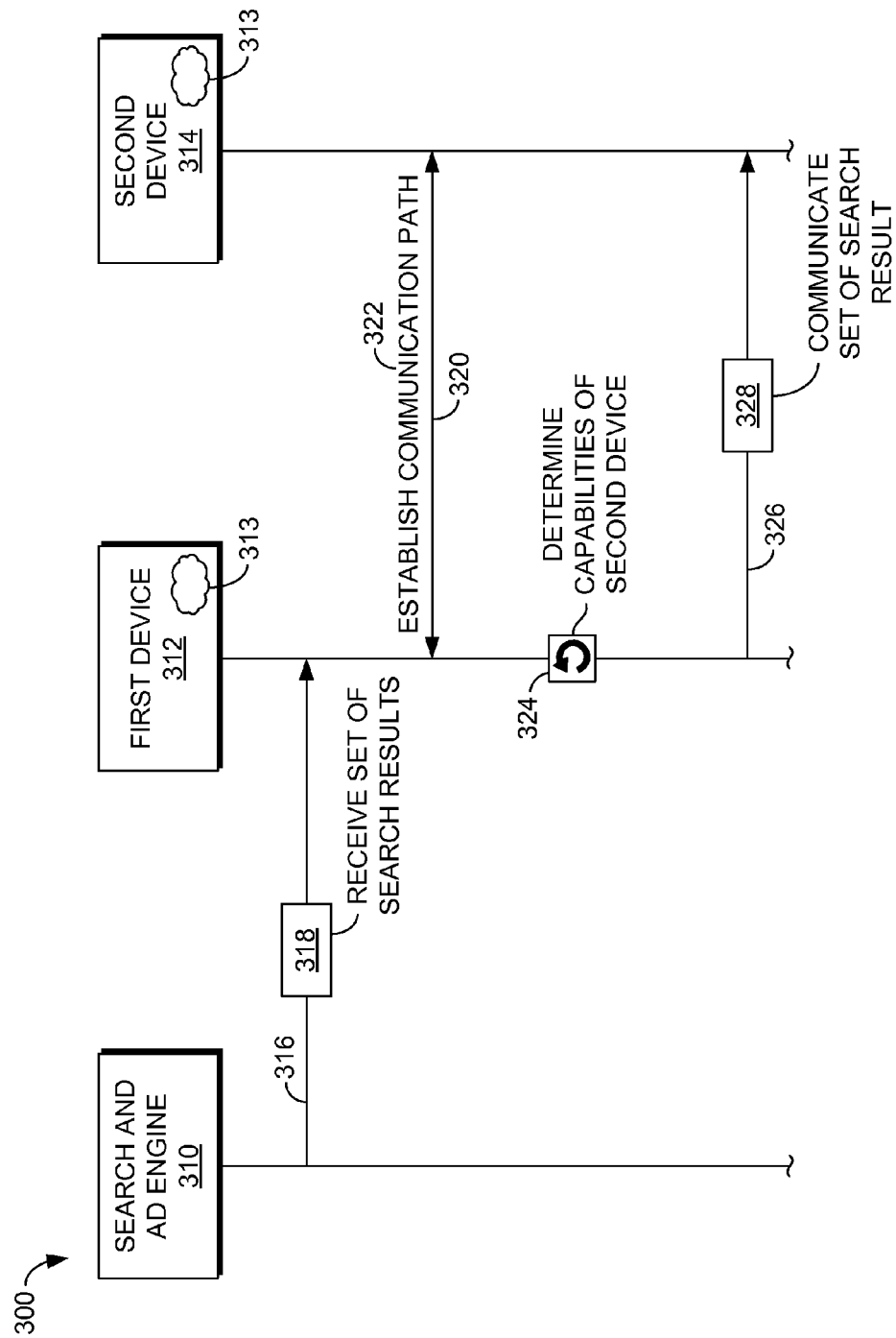
FIG. 3 depicts an illustrative process-flow diagram that depicts a method of synchronizing communication of a set of search results to multiple, disparate devices associated with a user in accordance with an embodiment of the present invention.

Turning now to FIG. 3, a process-flow diagram is depicted illustrating a method of synchronizing communication of a set of search results to multiple, disparate, devices associated with a user. The process-flow diagram is referenced generally by the numeral 300. FIG. 3 includes a search and advertisement engine 310, a first device 312, and a second device 314.

The search and advertisement engine 310 may be any Web-based search engine capable of communicating a set of search results in response to a user query. The search and advertisement engine 310 may be, for example, the search and advertisement engine 110 of FIG. 1, or the search and advertisement engine 210 of FIG. 2. In one aspect of the invention, the search and advertisement engine 310 accounts for user activities happening simultaneously on the first device 312 and the second device 314 when generating a ranking order for the set of search results.

Like above, the first device 312 and the second device 314 may be any device associated with a user. The first device 312 and the second device 314 are capable of communicating with the search and advertisement engine 310 and with other devices. The first device 312 and the second device 314 may include, among others, a cellular phone, a television, a tablet PC, and/or a PC such as, for example, the cellular phone 112, the television 114, the tablet PC 116, and the PC 118 of FIG. 1. The first device 312 and the second device 314 may be registered to the user, be on the user's account, owned by the user, leased by the user, or, in some way, identified with the user.

The first device 312 and the second device 314 may have an application 313 that enables the devices to synchronize a history of user activity across the devices. For example, a user may conduct a search query on the first device 312 and receive a useable set of search results. The useable set of search results may include any hyperlinks, advertisements, or rankings associated and displayed concurrently with the set of search results. The application 313 enables the first device 312 to seamlessly communicate the set of search results to the second device 314. Thus, instead of a user having to perform multiple searches for the same query on the different devices, the set of search results can be communicated from one device to the next. In addition, if a user interacts with the set of search results, the results of the interaction will be communicated from one device to the next.

In addition, the application 313 also enables the first device 312 to receive user inputs generated on the second device 314 and vice versa. By way of illustrative example, the first device 312 may be a tablet PC and the second device 314 may be a cellular phone. The tablet PC does not have a microphone while the cellular phone does have a microphone. A user may use the microphone on the cellular phone to input voice commands to be used to conduct a voice search. The application 313 converts the voice command into a text format that is useable by the tablet PC to conduct the search. Thus, a user input on the cellular phone is useable by the tablet PC to conduct the search.

In yet another example, the cellular phone may be equipped with a camera while the tablet PC lacks this capability. The user may want to conduct an image search on the tablet PC but is prevented from doing so by the lack of a camera. The user can use the cellular phone to take a picture, but because of the limited screen size and display capabilities of the cellular phone, the user would like to view the image search results on the tablet PC. In this case, the image may be communicated to the tablet PC and an image search performed. Alternatively, the image search may be conducted on the cellular phone and the results of the search communicated to the tablet PC which has more suitable display capabilities for viewing the results.

The application 313 may also enable the devices to discover other user-associated devices and determine their capabilities. The application 313 may enable the devices to establish a communication path, such as, for example, the communication path 120 of FIG. 1, in order to synchronize the devices and communicate the set of search results. In another aspect, the first device 312 and the second device 314 may innately support synchronization without the use of the application 313. Additionally, the application 313 may enable the devices to render a graphical representation of the set of search results that takes advantage of the determined capabilities. This process will be explained in greater depth below.

Continuing on with respect to FIG. 3, at step 316 a set of search results 318 is received by the first device 313. In one aspect, the set of search results is received from the search and advertisement engine 310 in response to a search query, while in another aspect, the set of search results may be received from another user-associated device (not shown).

At step 320, a communication path 322 is established between the first device 312 and the second device 314. As outlined above, the communication path 322 can be established by utilizing a variety of communication technologies. Some of the communication technologies require that the first device 312 be within a certain proximity range of the second device 314 in order to establish the communication path 322.

Although the communication path 322 may be utilized to synchronize the first device 312 and the second device 314, other ways of synchronizing the devices are contemplated to be within the scope of the invention. By way of illustrative example, a user may register an account for an Internet service and be required to provide a cellular phone number for the account. The search and advertisement engine 310 may have access to the cellular phone number. Thus, the search and advertisement engine 310 may communicate a set of search results to a PC in response to a search query, and, utilizing the cellular phone number, communicate the same set of search results to the cellular phone. As can be seen in this example, instead of the first device 312 communicating the set of search results to the second device 314, the search and advertisement engine 310 communicates the set of search results to the second device 314. As well, in this aspect, the first device 312 has not necessarily established the communication path 322 with the second device 314. Any and all such variations, and any combination thereof, are contemplated to be within the scope of embodiments of the present invention.

At step 324, the first device 312 determines the capabilities of the second device 314. As outlined above, this may include, for example, determining the proximity of the second device 314, determining display size, audiovisual capability, phone call capability, printer capability, Web-browsing capability, portability, word processing capability, image capture capability, electronic mailing capability, three-dimensional rendering capability, audio capture capability, and the like.

At step 326, the first device 312 communicates the set of search results 328 to the second device 314 utilizing the communication path 322 established at step 320. A graphical representation of the set of search results 328 on the second device 314 is dependent upon the determined capabilities of the second device 314. In one aspect, the graphical representation of the set of search results 328 includes a ranking order of the set of search results 328. By way of illustrative example, a user runs a search query on a tablet PC using the keyword "insurance." A set of search results are returned. Some of the search results contain addresses and phone numbers, while other search results are more visual, contain textual information, or require that the user fill out a form to obtain an insurance quote. If the set of search results is communicated to a cellular phone, the results containing addresses and phone numbers will be ranked higher than the more visual search results or the search results with a lot of textual information. But if the set of search results is communicated to a television, the results that are more visual in nature would be ranked higher than the other search results. Likewise, if the set of search results is communicated to a PC, the results that require the user to fill out a form to obtain an insurance quote will be ranked higher than the other search results.

The process outlined in FIG. 3 is applicable to any number of devices. For example, the first device 312 may establish the communication path 322 with a third device associated with the user and determine capabilities of the third device utilizing the communication path 322. As well, the first device 312 may communicate the set of search results 328 to the third device, where a graphical representation of the set of search results 328 depends on the determined capabilities of the third device. In addition, the second device 314 may establish the communication path 322 with a third device associated with the same user, determine capabilities of the third device, and communicate the set of search results 328 to the third device, where a graphical representation of the set of search results 328 depends on the determined capabilities of the third device. In addition, in yet another aspect, the first device 312 may receive a user response associated with the set of search results 328. The first device 312 may then communicate the user response associated with the set of search results 328 to the second device 314. Any and all such variations, and any combination thereof, are contemplated to be within the scope of embodiments of the present invention.

Figure 4:
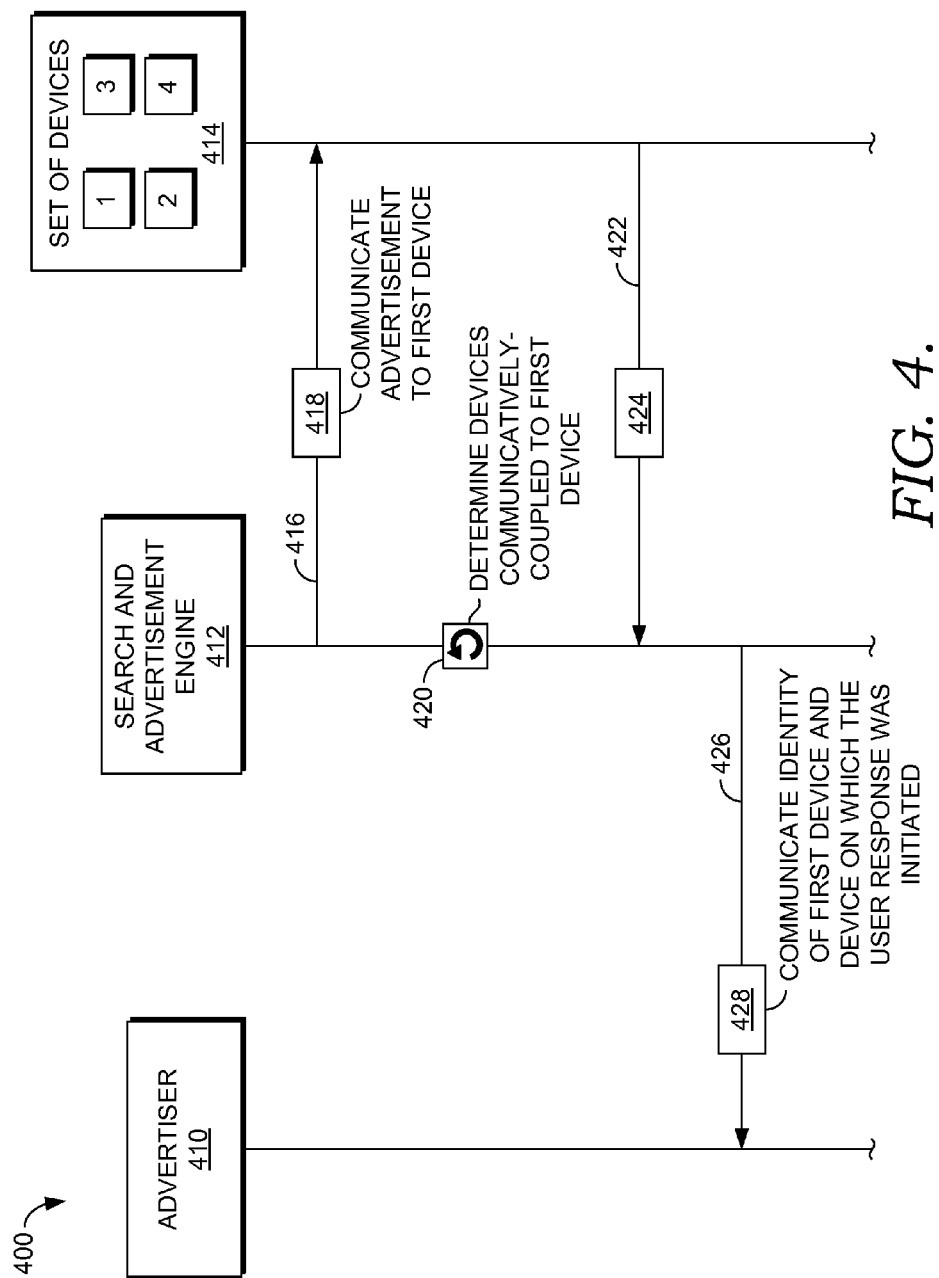
FIG. 4 depicts an illustrative process-flow diagram that depicts a method for enabling an advertiser to track a performance of an advertisement across a set of communicatively-coupled devices that are associated with a user in accordance with an embodiment of the present invention.

Turning now to FIG. 4, a process-flow diagram is depicted illustrating a method of enabling an advertiser to track a performance of an advertisement across a set of communicatively-coupled devices associated with a user. The process-flow diagram is referenced generally by the numeral 400. FIG. 4 includes an advertiser 410, a search and advertisement engine 412, and a set of communicatively-coupled devices 414.

The advertiser 410 comprises any advertiser who generates a unified advertising campaign that takes advantage of different capabilities of the user's devices. In addition, the advertiser 410 comprises any advertiser who is interested in tracking which device originally received the advertisement and which device received a user response to the advertisement.

The search and advertisement engine 412 may be any Web-based search and advertisement engine such as, for example, the search and advertisement engine 110 of FIG. 1. The search and advertisement engine 412 is capable of rendering and communicating advertisements to a plurality of different devices. In addition, the search and advertisement engine 412 is capable of delivering a set of search results in response to a user query. The search and advertisement engine 412 may be the same as the search and advertisement engine 210 of FIG. 2, or the search and advertisement engine 310 of FIG. 3.

The set of communicatively-coupled devices 414 comprises a set of devices associated with the user that are able to communicate with each other using some type of communication path such as, for example, the communication path 120 of FIG. 1. As mentioned with respect to FIG. 1, the communication path may utilize short-range wireless radio-frequency communication, near-field communication, a local area network, or a cellular phone network. In turn, the set of devices may comprise a cellular phone, a television, a PC, and/or a tablet PC such as, for example, the cellular phone 112, the television 114, the tablet PC 116, and the PC 118 of FIG. 1. Although four devices are shown in FIG. 4, the present invention is intended to encompass a multitude of devices associated with the user that are able to communicate with each other.

At step 416, an advertisement 418 is communicated from the search and advertisement engine 412 to a first device associated with the user. At step 420, the search and advertisement engine 412 determines which devices are communicatively coupled to the first device. The devices that are communicatively coupled to the first device comprise the set of communicatively-coupled devices 414. In one aspect, the first device determines which devices are communicatively coupled to the first device.

At step 422, a user response to the advertisement 418 is received by the search and advertisement engine 412. The user response is initiated on a device within the set of communicatively-coupled devices 414. By way of illustrative example, the first device may be a television which displays an advertisement for a company's product. But the user response may be received from a PC associated with the user that is communicatively coupled to the television. In one aspect, the user response may be initiated on the first device.

At step 428, the identity of the first device and the identity of the device in the set of communicatively-coupled devices 414 on which the user response was initiated are communicated to the advertiser 410. Thus, the advertiser 410 can now track the performance of the advertisement 418 across the set of communicatively-coupled devices 414.

In one aspect of the invention, once the advertisement 418 is received by the first device, the first device establishes a communication path with a second device associated with the user. Utilizing the communication path, the first device determines the capabilities of the second device. The first device renders a version of the advertisement 418 for the second device, where the version rendered is dependent upon the determined capabilities of the second device. And, utilizing the communication path, the rendered version of the advertisement 418 is communicated to the second device.

Turning now to FIG. 5, an illustrative flow diagram, referenced generally by the numeral 500, is depicted of a method of synchronizing communication of different versions of an advertisement to multiple, disparate devices associated with a user. At step 510, the advertisement is received on a first device associated with the user. At step 512, incident to receiving the advertisement, the first device establishes a communication path with a second device associated with the user. At step 514, capabilities of the second device are determined utilizing the communication path. At step 516, a version of the advertisement is rendered for the second device. The version rendered is dependent upon the determined capabilities of the second device. And at step 518, the rendered version of the advertisement is communicated to the second device using the established communication path.

With respect to FIG. 6, an illustrative flow diagram, referenced generally by the numeral 600, is depicted of a method of synchronizing communication of a set of search results to multiple, disparate devices associated with a user. At step 610, the set of search results are received at a first device associated with the user. At step 612, incident to receiving the set of search results, the first device establishes a communication path with a second device associated with the user. At step 614, capabilities of the second device are determined utilizing the communication path. And at step 616, the set of search results are communicated to the second device using the established communication path. A graphical representation of the set of search results is dependent upon the determined capabilities of the second device.

Turning to FIG. 7, an illustrative flow diagram, referenced generally by the numeral 700, is depicted of a method for enabling an advertiser to track a performance of an advertisement across a set of communicatively-coupled devices associated with a user. At step 710, the advertisement is communicated to a first device associated with the user. At step 712, it is determined which devices are communicatively coupled to the first device. The devices that are communicatively coupled to the first device comprise the set of communicatively-coupled devices. At step 714, a user response to the advertisement is received; the user response is initiated on a device in the set of communicatively-coupled devices. At step 716, the identity of the first device and the identity of the device in the set of communicatively-coupled devices on which the user response was initiated are communicated to the advertiser.

Exemplary Operating Environment

An exemplary computing environment suitable for use in implementing embodiments of the present invention is described below in order to provide a general context for various aspects of the present invention. Referring to FIG. 8, such an exemplary computing environment is shown and designated generally as computing device 800. The computing device 800 is but one example of a suitable computing environment and is not intended to suggest any limitation as to the scope of use or functionality of embodiments of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 8, the computing device 800 includes a bus 810 that directly or indirectly couples the following devices: a memory 812, one or more processors 814, one or more presentation components 816, one or more input/output (I/O) ports 818, I/O components 820, and an illustrative power supply 822. The bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computer" or "computing device."

The computing device 800 typically includes a variety of computer-readable media. Computer-readable media may be any available media that is accessible by the computing device 800 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 812 includes computer-storage media in the form of volatile and/or nonvolatile memory. The memory may be removable, non-removable, or a combination thereof. Exemplary hardware devices include solid-state memory, hard drives, optical-disc drives, and the like. The computing device 800 includes one or more processors that read data from various entities such as the memory 812 or the I/O components 820. The presentation component(s) 816 present data indications to a user or other device. Exemplary presentation components include a display device, speaker, printing component, vibrating component, and the like.

The I/O ports 818 allow the computing device 800 to be logically coupled to other devices including the I/O components 820, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

Conclusion

As can be seen, embodiments of the present invention provide systems, methods, and computer-readable media for, among other things, enabling an advertiser to leverage the capabilities of different user-associated devices in order to present a unified advertisement and search engine experience across the devices. In brief and at a high level, the capabilities of a set of communicatively-coupled devices associated with a user are determined, and appropriate versions of an advertisement are rendered and communicated to the devices. Each device displays a version of the advertisement that takes full advantage of the capabilities of that particular device. In another aspect, the devices display a uniform set of search results, but a graphical representation of the set of search results on each of the devices is dependent upon the determined capabilities of the device. In addition, the present invention enables the advertiser to track a performance of the advertisement across the set of devices.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 500 of FIG. 25, the method 600 of FIG. 6, and the method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer storage devices having computer-executable instructions embodied thereon that, when executed, facilitate a method of synchronizing communication of different versions of an advertisement to multiple, disparate user devices, including at least a first user device and a second user device, associated with a user, wherein a version communicated is dependent upon capabilities of each device of the multiple, disparate user devices, the method comprising:
   at the first user device of the multiple, disparate user devices associated with the user:
      receiving and displaying a first version of the advertisement, the advertisement comprising a set of data elements and the first version of the advertisement comprising a first subset of the set of data elements;
      incident to receiving the first version of the advertisement, establishing a first communication path between the first user device and the second user device associated with the user;
      utilizing the first communication path, determining capabilities of the second user device;
      based on the determined capabilities of the second user device, determining a second subset of the set of data elements that is to be included in a second version of the advertisement for the second user device, wherein the second subset is different from the first subset;
      rendering the second version of the advertisement for the second user device, the second version comprising the second subset of the set of data elements; and
      utilizing the first communication path, communicating the rendered second version of the advertisement to the second user device for display at the second user device.

2. The one or more computer storage devices of claim 1 further comprising:
   incident to receiving the first version of the advertisement, the first user device establishing a second communication path with a third user device associated with the user,
   utilizing the second communication path, the first user device determining capabilities of the third user device;
   the first user device rendering a third version of the advertisement for the third user device, the third version comprising a third subset of the set of data elements, wherein the third subset is different from both the first subset and the second subset, and wherein the third subset is dependent upon the determined capabilities of the third user device; and
   utilizing the second communication path, the first user device communicating the rendered third version of the advertisement to the third user device.

3. The one or more computer storage devices of claim 1, wherein the first user device and the second user device comprise two of the following: a television, a computer, a tablet personal computer, or a cellular phone.

4. The one or more computer storage devices of claim 1, wherein the first version of the advertisement is received from a search and advertisement engine, and wherein the search and advertisement engine renders the first version of the advertisement for the first user device.

5. The one or more computer storage devices of claim 1, wherein the user is engaged with the first user device when the first version of the advertisement is received on the first user device.

6. The one or more computer storage devices of claim 1, wherein the first communication path utilizes at least one of the following communication technologies: short-range wireless radio-frequency communication, near-field communication, a local area network, a wide area network, or a cellular phone network.

7. The one or more computer storage devices of claim 1, wherein the first user device and the second user device are within a proximity range of each other such that the first communication path can be established, wherein the proximity range is dependent upon a type of communication technology utilized by the first communication path.

8. The one or more computer storage devices of claim 1, wherein determining the capabilities of the second user device comprises determining one or more of display size, audiovisual capability, phone call capability, printer capability, Web-browsing capability, portability, word processing capability, image capture capability, electronic mailing capability, three-dimensional rendering capability, or audio capture capability.

9. The one or more computer storage devices of claim 8, wherein determining the capabilities of the second user device further includes determining an activity state of the second user device, and wherein the second user device is in an active state if it has been utilized by the user in the past two weeks.

10. The one or more computer storage devices of claim 1, wherein the first user device is enabled to receive user inputs from the second user device, and wherein the second user device is enabled to receive user inputs from the first user device.

11. One or more computer storage devices having computer-executable instructions embodied thereon that, when executed, facilitate a method of synchronizing communication of a set of search results to multiple, disparate user devices associated with a user, the method comprising:
   at a first user device of the multiple, disparate user devices associated with the user:
      receiving and displaying the set of search results on the first user device, the set of search results associated with a first ranking order;
      incident to receiving the set of search results, establishing a first communication path between the first user device and a second user device of the multiple, disparate user devices associated with the user;
      utilizing the first communication path, determining capabilities of the second user device;
      based on the determined capabilities of the second user device, determining a second ranking order for the set of search results, wherein the second ranking order is different from the first ranking order;
      rendering a graphical representation of the set of search results, wherein in the graphical representation, the set of search results are ranked according to the second ranking order; and
      utilizing the first communication path, communicating the graphical representation of the set of search results to the second user device.

12. The one or more computer storage devices of claim 11 further comprising:
   incident to receiving the set of search results, the first user device establishing a second communication path with a third user device associated with the user;
   utilizing the second communication path, determining capabilities of the third user device;
   rendering a modified graphical representation of the set of search results, the modified graphical representation being dependent upon the determined capabilities of the third user device; and
   utilizing the second communication path, communicating the modified graphical representation of the set of search results to the third user device.

13. The one or more computer storage devices of claim 11 further comprising:
   at the first user device, receiving a user response associated with the set of search results; and
   communicating the user response associated with the set of search results to the second user device.

14. The one or more computer storage devices of claim 11, wherein the set of search results includes hyperlinks within the set of search results and advertisements displayed concurrently with the set of search results.

15. One or more computer storage devices having computer-executable instructions embodied thereon that, when executed, facilitate a method of enabling an advertiser to track a performance of an advertisement across a set of communicatively-coupled user devices associated with a user, the method comprising:
   communicating the advertisement to a first user device having a first processor and a first memory, wherein the advertisement is displayed at the first user device;
   determining the set of communicatively-coupled user devices associated with the user that are communicatively coupled to the first user device;
   receiving, from a second user device within the set of communicatively-coupled user devices, a user response to the advertisement, wherein the user response is initiated on the second user device, the second user device having a second processor and a second memory, wherein the second user device is different from the first user device and received a rendered version of the advertisement from the first user device, wherein the rendered version of the advertisement is based upon capabilities of the second user device determined by the first user device; and
   communicating to the advertiser an identity of the first user device and an identity of the second user device within the set of communicatively-coupled user devices on which the user response was initiated.

16. The one or more computer storage devices of claim 15 further comprising:
   at the first user device:
      receiving the advertisement on the first user device;
      incident to receiving the advertisement, the first user device establishing a communication path with the second user device associated with the user;
      utilizing the communication path, determining capabilities of the second user device;
      rendering the version of the advertisement for the second user device; and
      utilizing the communication path, communicating the rendered version of the advertisement to the second user device.

17. A first user device associated with a user, the first user device comprising:
   a processor; and
   a computer storage medium having computer-executable instructions embodied thereon that, when executed by the processor, cause the processor to:
      receive and display a first version of an advertisement at the first user device, the advertisement comprising a set of data elements and the first version of the advertisement comprising a first subset of the set of data elements,
      incident to receiving the first version of the advertisement, establish a first communication path between the first user device and a second user device associated with the user, utilizing the first communication path, determine capabilities of the second user device, wherein determining the capabilities of the second user device includes determining a proximity between the second user device and the first user device, based on the determined capabilities of the second user device, including the determined proximity between the second user device and the first user device, determine a second subset of the set of data elements that is to be included in a second version of the advertisement for the second user device, wherein the second subset is different from the first subset, render the second version of the advertisement for the second user device, the second version comprising the second subset of the set of data elements, and utilizing the first communication path, communicate the rendered second version of the advertisement to the second user device.

18. The first user device of claim 17, wherein determining the capabilities of the second user device comprises determining one or more of display size, audiovisual capability, phone call capability, printer capability, Web-browsing capability, portability, word processing capability, image capture capability, electronic mailing capability, three-dimensional rendering capability, or audio capture capability.

19. The first user device of claim 17, wherein the first user device is enabled to receive user inputs from the second user device, and wherein the second user device is enabled to receive user inputs from the first user device.

20. The first user device of claim 17, wherein the first communication path utilizes at least one of the following communication technologies: short-range wireless radio-frequency communication, near-field communication, a local area network, a wide area network, or a cellular phone network.

21. A method for synchronizing communication of different versions of an advertisement to multiple, disparate user devices associated with a user, the multiple, disparate user devices including at least a first user device and a second user device, the method comprising:
at the first user device of the multiple, disparate user devices associated with the user:
receiving and displaying a first version of the advertisement at the first user device, the advertisement comprising a set of data elements and the first version of the advertisement comprising a first subset of the set of data elements;
incident to receiving the first version of the advertisement, establishing a first communication path between the first user device and the second user device associated with the user;
utilizing the first communication path, determining capabilities of the second user device;
at a processor of the first user device, based on the determined capabilities of the second user device, determining a second subset of the set of data elements that is to be included in a second version of the advertisement for the second user device, wherein the second subset is different from the first subset;
rendering the second version of the advertisement for the second user device, the second version comprising the second subset of the set of data elements; and
utilizing the first communication path, communicating the rendered second version of the advertisement to the second user device for display at the second user device.

22. The method of claim 21, wherein determining the capabilities of the second user device includes determining a proximity between the second user device and the first user device.

23. The method of claim 21, wherein the first user device is enabled to receive user inputs from the second user device, and wherein the second user device is enabled to receive user inputs from the first user device.

24. The method of claim 23, further comprising:
at the first user device:
receiving a user input associated with the first version of the advertisement; and
communicating the user input to the second user device.

25. A first device comprising:
a processor; and
a computer storage medium having computer-executable instructions embodied thereon that, when executed by the processor, cause the processor to:
display a first version of an advertisement at the first device, the advertisement comprising a set of data elements and the first version of the advertisement comprising a first subset of the set of data elements,
determine capabilities of a second device,
based on the determined capabilities of the second device, determine a second subset of the set of data elements that is to be included in a second version of the advertisement for the second device, wherein the second subset is different from the first subset,
render the second version of the advertisement for the second device, the second version comprising the second subset of the set of data elements, and
provide the rendered second version of the advertisement to the second device.

* * * * *